(12) United States Patent
Kawakami et al.

(10) Patent No.: US 11,038,991 B2
(45) Date of Patent: Jun. 15, 2021

(54) ABNORMALITY DETECTION DEVICE, METHOD THEREOF, AND COMMUNICATION SYSTEM

(71) Applicant: DENSO CORPORATION, Kariya (JP)

(72) Inventors: Tatsuro Kawakami, Kariya (JP); Takeshi Sugashima, Kariya (JP)

(73) Assignee: DENSO CORPORATION, Kariya (JP)

( * ) Notice: Subject to any disclaimer, the term of this patent is extended or adjusted under 35 U.S.C. 154(b) by 6 days.

(21) Appl. No.: 16/126,301

(22) Filed: Sep. 10, 2018

(65) Prior Publication Data
US 2019/0104204 A1 Apr. 4, 2019

(30) Foreign Application Priority Data
Sep. 29, 2017 (JP) .............................. JP2017-191781

(51) Int. Cl.
*H04L 29/06* (2006.01)
*H04L 12/26* (2006.01)
*H04L 1/20* (2006.01)
*H04B 1/02* (2006.01)

(52) U.S. Cl.
CPC .............. *H04L 69/22* (2013.01); *H04L 1/201* (2013.01); *H04L 1/205* (2013.01); *H04L 43/08* (2013.01); *H04L 43/0847* (2013.01); *H04L 63/00* (2013.01); *H04B 1/02* (2013.01)

(58) Field of Classification Search
CPC ........... H04B 1/02; H04L 1/201; H04L 1/205; H04L 43/08; H04L 43/0847; H04L 63/00; H04L 63/1425; H04L 69/22; H04L 12/417; H04L 67/12
See application file for complete search history.

(56) References Cited

U.S. PATENT DOCUMENTS

| | | | |
|---|---|---|---|
| 9,405,903 B1 * | 8/2016 | Xie ........................ | G06F 21/56 |
| 2008/0008209 A1 * | 1/2008 | Morimoto ......... | H04L 12/40013 370/458 |
| 2009/0034421 A1 * | 2/2009 | Kodama ................ | H04L 43/50 370/242 |
| 2013/0339721 A1 * | 12/2013 | Yasuda .................. | G07C 5/008 713/100 |

(Continued)

FOREIGN PATENT DOCUMENTS

JP 2014187445 A * 10/2014 ............ H04L 12/40

*Primary Examiner* — Un C Cho
*Assistant Examiner* — Shah M Rahman
(74) *Attorney, Agent, or Firm* — Posz Law Group, PLC (57) ABSTRACT

An abnormality detection device includes: a receiver, a reception predictor, frame information storage, and an abnormality determiner. The receiver receives a communication frame via a communication network. The frame information storage stores information regarding the communication frame. The reception predictor calculates and sets a predicted time range including a scheduled reception time of the communication frame of a target frame type from among a plurality of frame types received by the receiver by referencing the frame information storage and the reception time of the communication frame when the communication frame is received. The abnormality determiner determines the target communication frame is an abnormal frame when the target communication frame is received at a time outside the predicted reception range.

1 Claim, 7 Drawing Sheets

(56) References Cited

U.S. PATENT DOCUMENTS

| | | | | |
|---|---|---|---|---|
| 2014/0328352 A1* | 11/2014 | Mabuchi | ............. | H04L 12/4035 370/451 |
| 2014/0337963 A1* | 11/2014 | Bhattacharyya | .... | H04L 63/0227 726/13 |
| 2015/0358351 A1* | 12/2015 | Otsuka | ................ | H04L 12/4625 726/23 |
| 2016/0205194 A1* | 7/2016 | Kishikawa | .............. | H04L 63/10 726/1 |
| 2016/0330236 A1* | 11/2016 | Reddy | ................. | H04L 63/1425 |
| 2017/0359241 A1* | 12/2017 | Takada | ................ | H04L 12/4625 |
| 2019/0052677 A1* | 2/2019 | Wakita | ................. | H04L 63/302 |
| 2020/0382953 A1* | 12/2020 | Li | ........................... | H04L 69/24 |

* cited by examiner

ABNORMALITY DETECTION DEVICE, METHOD THEREOF, AND COMMUNICATION SYSTEM

CROSS REFERENCE TO RELATED APPLICATION

The present application is based on and claims the benefit of priority of Japanese Patent Application No. 2017-191781, filed on Sep. 29, 2017, the disclosure of which is incorporated herein by reference.

TECHNICAL FIELD

The present disclosure generally relates to an abnormality detection device in a communication network, an abnormality detection method, and a communication system.

BACKGROUND INFORMATION

A network-based intrusion detection system, or NIDS, is used to detect an intrusion into a company system such as improper data accesses.

PCT application WO 2013/094072, i.e., patent document 1, discloses one such system, as well as disclosing a detection method for detecting and determining whether messages exchanged in a communication system are proper/improper by using a simple configuration. This communication system includes a plurality of electronic control units, or ECUs, communicably connected to a communication bus. Each of the ECUs has a different communication interval setting that is respectively defined for different message types, based on the transmission performed by those ECUs. The ECU on the receiving side of the message detects the communication interval of the received message, and, based on a comparison between the detected communication interval and the preset communication interval described above, determines whether the received message is proper or improper.

The communication system disclosed in patent document 1 may be effective in terms of detecting an abnormality of a communication frame. However, the communication interval may vary based on the network communication load, and/or ECU processing load. As such, the communication system and detection method described in patent document 1 may be less effective for low-load networks and low-load ECUs due to a communication interval setting that is intended to maximize the tolerance range of the interval. That is, such systems and methods may have lower abnormality detections rates in low-load networks/processors due to the communication interval settings. As such, once such a tolerance range of the communication interval for the low-load time is set and used as a standard/reference range, the abnormality detection by the system in the patent document 1 may not work properly. That is, the system and method of patent document 1 may make false abnormality detections at times where there is a high communication load on the network and when there is a high processing load on the ECU/processor.

SUMMARY

It is an object of the present disclosure to provide an abnormality detection device and method for use in a communication network that has a high abnormality detection rate while minimizing false abnormality detections (e.g., determining false positives as abnormalities), as well as a communication system utilizing such an abnormality detection device and method.

In an aspect of the present disclosure, an abnormality detection device may include a receiver, a frame information storage, a reception predictor, and an abnormality determiner. The receiver may be configured to receive a communication frame via a communication network. The frame information storage may be configured to store information regarding the communication frame received by the receiver. The reception predictor may be configured to calculate and to set a predicted time range that includes a scheduled reception time of a communication frame of a target frame type from among a plurality of frame types received by the receiver when the communication frame is received by the receiver, the predicted time range being calculated with reference to a reception time of the communication frame by the receiver. The abnormality determiner may be configured to determine the communication frame of the target frame type as an abnormal frame when the communication frame of the target frame type is received at a time outside the predicted time range.

With the configuration described above, the abnormality detection device can achieve a high detection rate for detecting an abnormal frame in the communication while minimizing the number of false abnormality detections.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, with reference to the accompanying drawings, the present disclosure regarding a configuration of a communication system 100 and an electronic control unit serving as an abnormality detection device 200 is described with reference to the drawings.

[Configuration of Communication System]

Figure 1:
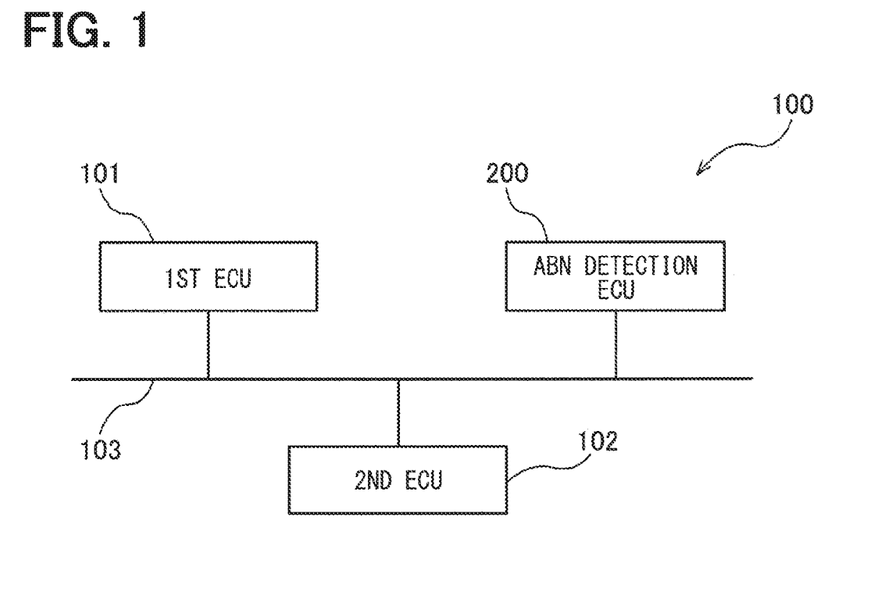
FIG. 1 is a block diagram of a communication system regarding one embodiment of the present disclosure.

As shown in FIG. 1, the communication system 100 includes a first electronic control unit (ECU) 101, a second electronic control unit (ECU) 102, and an abnormality detection device 200. The first ECU 101, the second ECU 102, and the abnormality device 200 are connected to, and can communication with each other via, a communication network 103.

Various communication standards and techniques are used to implement the communication network 103, such as (i) a serial communication standard, e.g., a CAN (Registered trademark) standard, and (ii) a LAN (Local Area Network) communication standard, e.g., an Ethernet (Registered trademark) standard, a Wi-Fi (Registered trademark) standard, together with other communication methods. The first electronic control unit 101 and the second electronic control unit 102 respectively transmit and receive a communication frame to/from each other, and the abnormality detection device 200 receives the communication frame transmitted and received by the first electronic control unit 101 and the second electronic control unit 102.

Each of the first electronic control unit 101, the second electronic control unit 102, and the abnormality detection device 200 may be configured as electronic control units (ECUs). An ECU is an embedded system in vehicle electronics that may control one or more electrical systems and subsystems in a vehicle.

Each of the electronic control units 101, 102 and the abnormality detection device 200 may include a plurality of semiconductor devices, such as a central processing unit (CPU), a volatile memory such as a random-access memory (RAM), and a non-volatile memory such as a flash memory. Each electronic control unit may also include communication links and a network interface section connected to the communication network 103. The ECUs may further include input/output (I/O) circuitry, for example, to input a supply voltage, send/receive communications, to input sensor/actuator data, to output drive signals to drive various elements in the vehicle's electrical system/subsystem. The ECUs may be configured as a packaged semiconductor device, e.g., as a single-chip microcontroller, chip, IC, or may be configured as having the semiconductor devices connected via conductive tracks/traces on a substrate, e.g., a printed circuit board, single-board microcontroller. In the drawings, the electronic control unit is designated as an "ECU."

[Configuration of Abnormality Detection Device]

Figure 2:
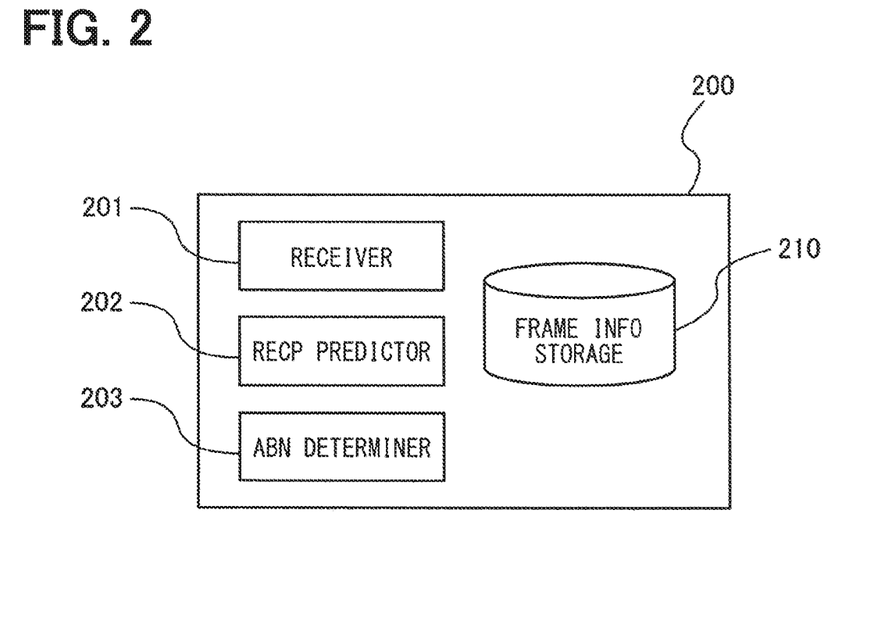
FIG. 2 is a block diagram of an abnormality detection device regarding one embodiment of the present disclosure.

As shown in FIG. 2, the abnormality detection device 200 has a receiver 201, a reception predictor 202, an abnormality determiner 203, and a frame information storage 210. While the abnormality device 200 may be configured as an ECU or microcontroller as described above, where the receiver 201, the reception predictor 202, and the abnormality determiner 203 are functional blocks of the ECU/microcontroller whose functions and operations are realized by the ECU/microcontroller, each of the receiver 201, the reception 202, and the abnormality determiner 203 may also be realized as stand-alone hardware. For example, each of the elements, that is, the receiver 201, the reception predictor 202, and the abnormality determiner 203 may be realized by analog circuit components, digital circuit components, logic devices, and any combination thereof, and configured to perform the respective functions/operations of the subject element, as described in greater detail below. That is, the receiver 201, the reception predictor 202, and the abnormality determiner 203 may be a configuration of hardware/circuitry configured to perform a specific function/operation, as described in greater detail below. For example, the receiver 201, the reception predictor 202, and the abnormality determiner 203 may be realized by an application-specific integrated circuit (ASIC), field-programmable gate array (FPGA), or like circuitry configured to perform the specific function/operations of the respective elements.

The receiver 201 receives a communication frame via the communication network 103. The reception predictor 202 calculates and sets a predicted time range when the receiver 201 receives the communication frame. The predicted time range is a time range for receiving a target communication frame of a specific frame type from among a plurality of frame types. More specifically, the predicted time range is a time range that includes a scheduled reception time of a communication frame having the target frame type when the receiver 201 receives the communication frame. The predicted time range is set with reference to a reception time of the communication frame by the receiver 201. The abnormality determiner 203 determines that the target communication frame is an abnormal frame, when the target communication frame is received outside the predicted time range. The frame information storage 210 saves information about the communication frame.

Here, "information about the communication frame" may mean and include information or attributes of each of the various types of communication frames. For example, the information may include (i) the periodicity at which the communication frame is transmitted (e.g., whether a communication frame is periodically transmitted), (ii) information related to the sender ECU (e.g., transmission origin) of a communication frame, (iii) whether a communication frame is non-periodically transmitted, and (iv) whether a non-periodical transmission of a frame affects a periodical transmission period of the frame. The "target communication frame" may be defined as a communication frame of the same type, that is, having a certain frame type. That is, when communication frames convey the same type of information, those communication frames are considered as having the same type. Communication frames of the same type may be transmitted periodically, non-periodically, or as a combination of both. The received communication frame may be the same frame type as the target communication frame, or may be a different frame type.

"Target communication frame" or a "target frame type" communication frame may be used to describe a vehicle control instruction frame or a communication frame storing sensor data for vehicle control. For example, a target communication frame may include a collision avoidance braking instruction or obstacle detection sensor data used to control a braking function for collision avoidance/mitigation.

The "scheduled reception time" may be calculated together with the predicted time range, and, in such case, the predicted time range may be defined as a range of time defined by reserving a preset period of time (e.g., a tolerance range) before and after the scheduled reception time. When the abnormality determiner 203 determines an abnormality in the communication frame, the abnormal communication frame may be further processed. That is, for example, the abnormal communication frame may be discarded, may undergo a virus check/scan, and a result of such virus check, a notification regarding the abnormality may be sent to other, external devices. By having such a configuration, the abnormality detection device 200 and the communication system 100 can detect improper communication at a higher detection rate and with a lower amount of false abnormality detections. A false abnormality detection may be erroneously detecting a normal communication frame as an abnormal communication frame, because the normal communication frame appears as, or has the characteristics of, an abnormal communication frame, i.e., a false positive.

Here, the reception predictor 202 may change the predicted time range of the target communication frame, when the receiver 201 receives a communication frame. In such case, changing the predicted time range may include both increasing and decreasing (i.e., extending and reducing) the predicted time range. Such a change may also include changing the scheduled reception time in the predicted time range. Using such a configuration, the preset, predicted time range can be changed even when the scheduled reception time of a normal communication frame is changed due to, for example, a processing load on the processor/CPU and/or a communication load on the network. Using a configuration that allows both the schedule reception time and predicted time range to be changed, enables the detection of improper communication at a higher detection rate and while lowering the false abnormality detection rate.

Figure 3:
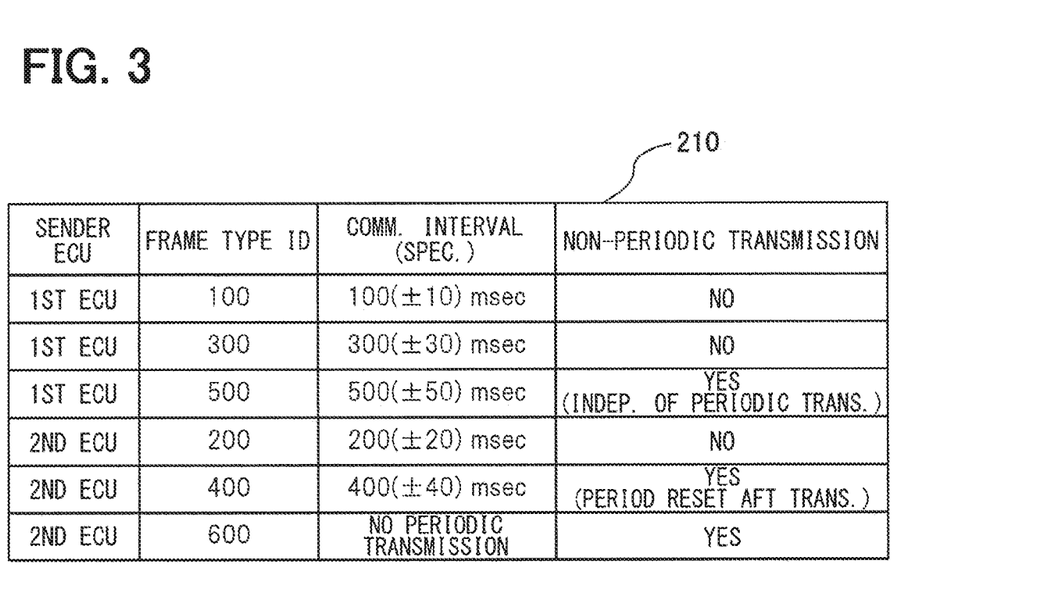
FIG. 3 is a table diagram of information stored in a frame information storage.

As shown in FIG. 3, the frame information storage 210 can save a relationship between an identifier of a periodically-transmitted communication frame and a transmission period of such frame, shown as "FRAME TYPE ID" and "COMM. INTERVAL" in FIG. 3. In the table diagram of FIG. 3, the transmission period is designated as communication interval based on a specification of the system. According to such relationship, the reception predictor 202 can calculate and set the scheduled reception time of when the next target communication frame will be received by referencing the frame information storage 210. As shown in FIG. 3, the frame information storage 210 may further save a priority of transmission based on the type of communication frame, and an identifier of a sender device (e.g., ECU) transmitting the various types of communication frames. Here, FIG. 3 shows the first electronic control unit 101 as "1 ECU" and the second electronic control unit 102 as "2ECU." As shown in parentheses under the communication interval column in FIG. 3, the tolerance ranges are specified with a "±" sign, which may be used to define the predicted time range by applying/setting such tolerance ranges before and after the scheduled reception time. The identifier may simply be designated as "ID" in FIG. 3.

The "priority" described above may further be described as a frame type ID. That is, for example, the set priority may be higher when the frame type ID has a smaller number. Setting a frame priority for the communication frames may help the frames avoid frame collision on the communication network 103. That is, a transmission frame with a high priority frame type ID may take transmission priority on the communication network 103 over a transmission frame with another frame type ID to resolve possible collisions. In such cases, a low priority communication frame may be transmitted at a later time, that is, after a preset amount of time elapses.

In FIG. 3, the priority of a frame is shown in the "FRAME TYPE ID" by the numerical value of the identifier of the communication frame, and a smaller number frame identifier is set to have a higher priority. For example, in FIG. 3, frame type ID "100" has the highest priority. By having such configuration, the reception predictor 202 can determine the change of the predicted time range by referencing the priority of the communication frame according to the frame type and the identifier of the sender device transmitting the various types of communication frames.

The frame information storage 210 can save information/attributes such as, for example, whether a non-periodic communication frame is transmitted and whether a non-periodic communication frame resets a transmission period, as shown in the non-periodic transmission column of FIG. 3. Note that a non-periodic communication frame may be, for example, a communication frame transmitted at the generation or occurrence of a non-periodic event, that is, when a non-periodic event occurs. A non-periodic communication frame may also be transmitted periodically. The reset of a transmission period may mean that a non-periodic transmission of a communication frame triggers the start of a periodic transmission period of the communication frames. By referencing the information saved in the frame information storage 210, the reception predictor 202 can set the predicted time range based on whether the non-periodic communication frame has been transmitted, and based on whether the non-periodic communication frame will reset the transmission period.

[Abnormality Detection Device Operation]

An abnormality detection process S100 of the abnormality detection device 200 is described with reference to the flowchart in FIG. 4.

At S101, the receiver 201 receives a communication frame that may be exchanged between (e.g., transmitted/received) the first electronic control unit 101 and the second electronic control unit 102. Next, at S102, the abnormality determiner 203 determines whether a reception time of the communication frame is within the predicted time range. If the reception time is within the predicted time range, the process proceeds to S105.

Figure 4:
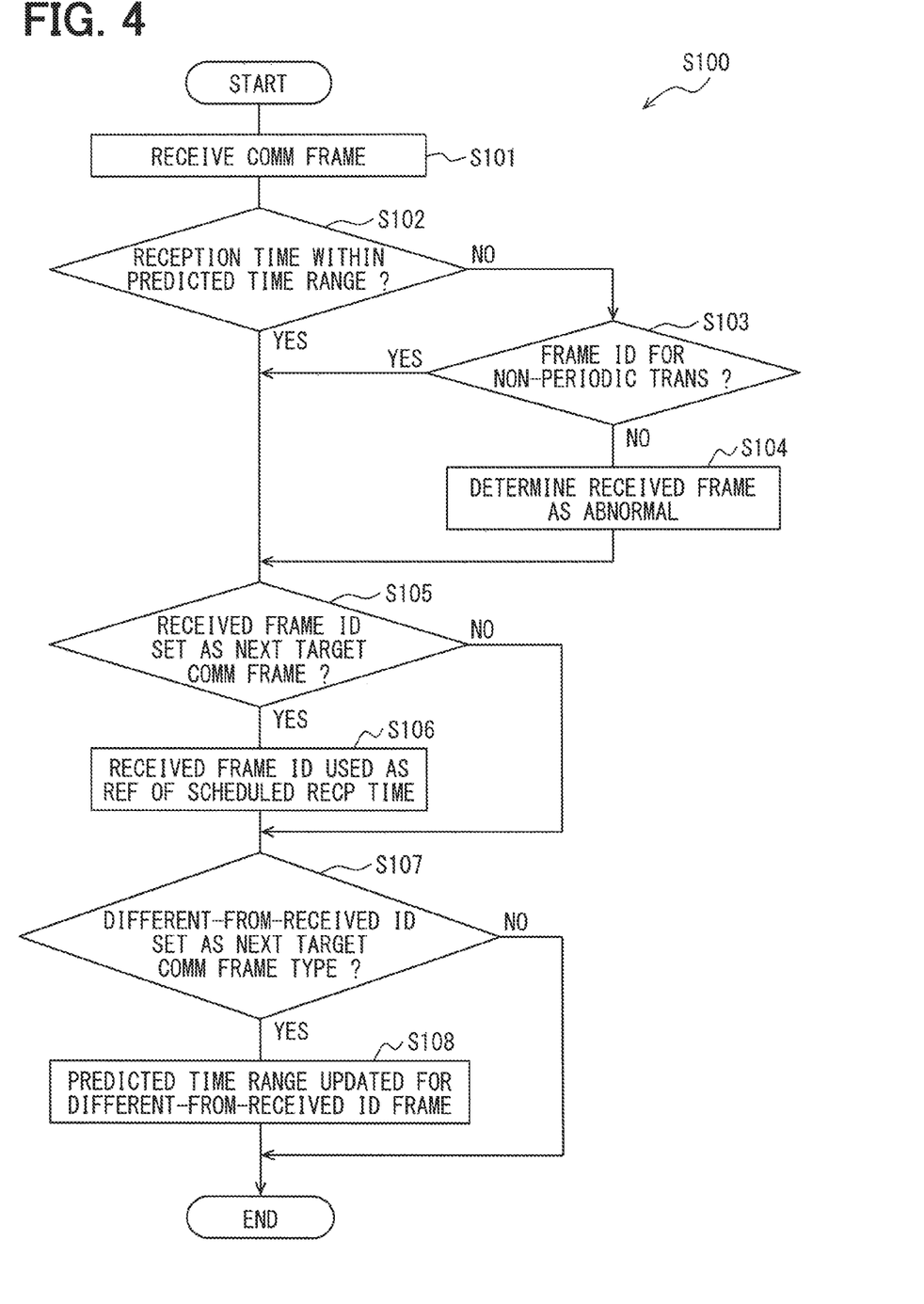
FIG. 4 is a flowchart of an abnormality detection process performed by the abnormality detection device.

If however at S102 the reception time is not within the predicted time range, the abnormality determiner 203 determines, at S103 whether the received communication frame has an identifier (e.g., frame type ID), shown as "FRAME ID" in S103 of FIG. 4, indicating a non-periodic frame transmission by referencing the frame information storage 210. If the abnormality determiner 203 determines that the communication frame has an ID indicating non-periodic frame transmission at S103, the process proceeds to S105. If however the frame ID does not indicate a non-periodic transmission at S103, i.e., "NO" at S103, the process proceeds to S104, it is determined that the received frame is an abnormal frame, and the process proceeds to S105. If the frame information storage 210 is configured not to store information regarding whether to perform a non-periodic transmission or not, it may be determined, at Step S103, that the received frame is an abnormal frame.

When the communication frame to be transmitted non-periodically is transmitted when a non-periodic event is generated, the abnormality determiner 203 may confirm at S103 whether the non-periodic event has occurred or has been generated. If the abnormality determiner 203 can confirm the generation/occurrence of the non-periodic event, the abnormality determiner may determine that the received frame is not an abnormal frame. The absence of an abnormal frame determination may mean that the frame is a normal frame.

At S105, the reception predictor 202 determines whether the identifier of the received frame indicates that the reception of the next target communication frame has been scheduled.

If the reception predictor 202 makes an affirmative determination at S105, the process proceeds to S106 and the reception predictor 202 determines whether the target communication frame has the same identifier as the received frame, and if so, the predicted time range for receiving the next target communication frame is set by referencing/using the identifier of the received frame, shown as "RECEIVED FRAME ID USED AS REF OF SCHEDULED RECP TIME" in FIG. 4. The process then proceeds to S107. If the reception predictor makes a negative determination at S105, the process proceeds directly to S107.

At S107, the reception predictor 202 determines whether to set a communication frame having an ID that is different from the received ID as the target communication frame for the next scheduled reception.

If the reception predictor 202 makes an affirmative determination at S107, the process proceeds to S108. At S108, the predicted time range for receiving the communication frame having an ID that is different from the received ID is set. The predicted time range is the time range of the scheduled reception time for the communication frame having the different ID, shown as "PREDICTED TIME RANGE UPDATED FOR DIFFERENT-FROM-RECEIVED ID FRAME" in FIG. 4. After S108, the process ends. If the reception predictor 202 makes a negative determination at S107, the process ends. The above-described abnormality detection process S100 is repeated when a communication frame is received by the abnormality detection device 200.

The above-described abnormality detection process S100 may be performed when a program stored on non-transitory computer readable medium is executed by a CPU or other processing device. For example, the abnormality detection device 200 or the components of the abnormality detection device 200 (e.g., the receiver 201, the reception predictor 202 the abnormality determiner 203) may perform the abnormality detection process S100 when a non-transitory computer readable medium storing the abnormality detection process S100 is executed by a CPU or other processor. The program may be stored on/in a non-transitory, substantive storage medium such as a semiconductor memory. Alternatively, the above-described abnormality detection process S100 may be implemented solely as hardware process by using digital/analog circuits, or as a combination of a software process and a hardware process.

[Example Processes of the Reception Predictor]

Figure 5:
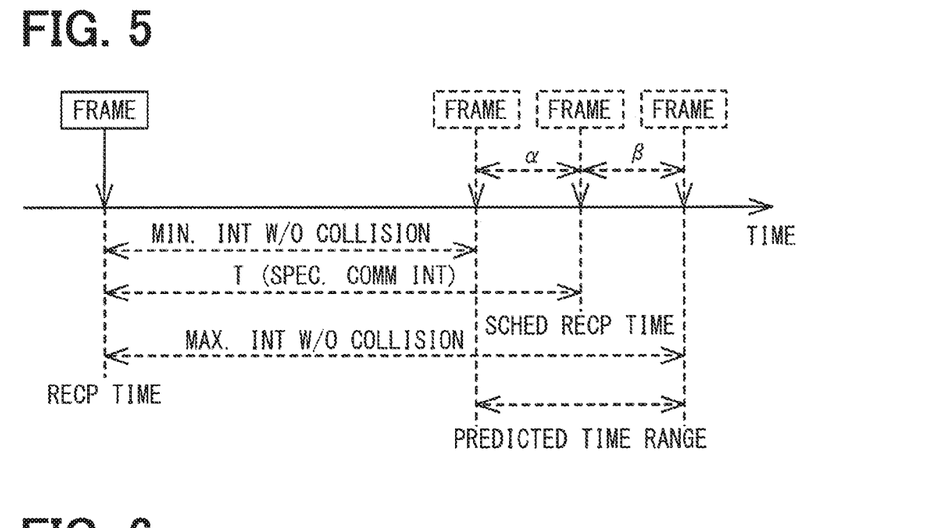
FIG. 5 illustrates a predicted time range.

The predicted time range when the communication load of the communication network 103 and the processing loads of each of the electronic control units are low is described with reference to FIG. 5. In FIG. 5 and subsequent drawings, a "Frame" framed by a solid line is a communication frame that has actually been received. On the other hand, a "Frame" framed by a broken line has not yet been received and is a predicted or scheduled reception communication frame. The arrows on the predicted, not-yet-received frames point to the scheduled reception time of the frame. The scheduled reception time of a frame is described and illustrated as an amount of time that elapses, i.e., a communication interval T, after a periodically-transmitted frame is received. Difference values α and β may be used with the communication interval T to define a predicted time range. The difference value α is a difference between a minimum communication interval without collision on the communication network 103 and a regular/normal communication interval T according to a specification of the network 103. The difference value β is a difference between a maximum communication interval without collision on the communication network 103 and the regular/normal communication interval T according to the specification. A predicted time range may be defined as a duration between the minimum communication interval without collision (T−α) and the maximum communication interval without collision (T+β). The abnormality determiner 203 can determine that a received frame is an abnormal frame when the reception of the frame happens outside the predicted time range, that is, when the frame is received outside the predicted time range.

Figure 6:
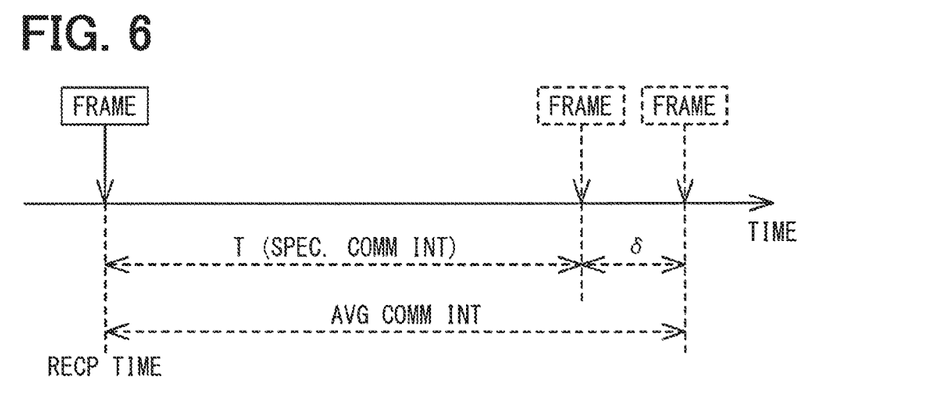
FIG. 6 illustrates a retransmission of a communication frame during a communication frame collision.

The retransmission of a communication frame due to frame collision is described with reference to FIG. 6. When a collision between communication frames occurs, a low-priority sender ECU retransmits a lower priority communication frame after a preset amount of time. The difference between the average communication interval of the retransmitted communication frame and a regular/normal communication interval T is defined as δ. The average communication interval with a collision is represented as (T+δ).

Figure 7:
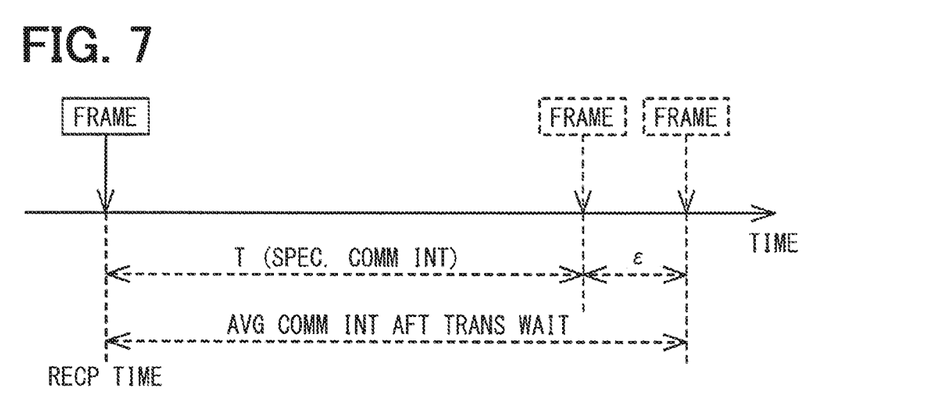
FIG. 7 illustrates a transmission waiting to be transmitted on a transmission side electronic control unit.

A pending transmission case in the electronic control unit where a hold or pendency is placed on a communication frame to be sent, referred to here as a transmission waiting generated case in the electronic control unit, is described with reference to FIG. 7. A pending transmission case may be a case where transmission waiting occurs, that is, a hold, wait, or pendency is placed on the communication frame before the ECU can transmit the communication frame, i.e., where an ECU waits before sending a communication frame. The ECU performs a retransmission after the transmission waiting period in the electronic control unit is released/cancelled. A difference between (i) an average of the communication interval of the transmitted communication frame transmitted after a release of transmission waiting, and (ii) a regular/normal communication interval T is defined as ε, and the average communication interval in the transmission waiting generated case is represented as (T+ε).

Figure 8:
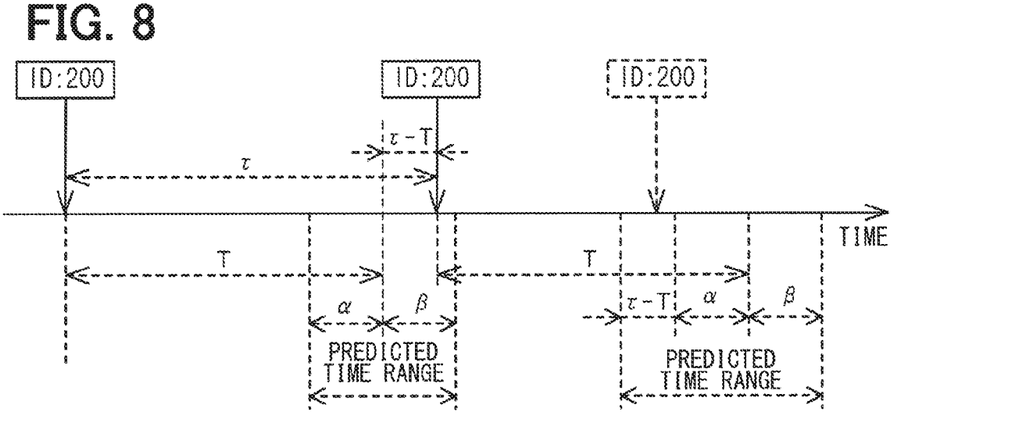
FIG. 8 illustrates predicting a time range of another target communication frame when a target communication frame is received within the predicted time range.

FIG. 8 shows an example, where a periodically transmitted communication frame with ID 200 is received within the predicted time range. In such case, as shown in FIG. 8, when the reception time of the target communication frame is later than the scheduled reception time, a difference between the reception time and the scheduled reception time is represented by using an actual communication interval τ as (τ−T). In such case, the predicted time range of a subsequent target communication frame may be lengthened or extended by adding the difference (τ−T) amount to the start time of the subsequent predicted time range, as shown in FIG. 8. It may be problematic, for example, when the second electronic control unit 102 that transmits the communication frame with ID 200 continues transmitting the communication frame with ID 200 by using the same transmission period even when delays are caused by frame collisions and frame retransmissions, without accounting for, or taking such delays into consideration. Therefore, by expanding a "normal" predicted time range T to expand the scheduled reception time by adding a difference (τ−T) amount to the beginning of subsequent scheduled reception times, the false detection rate can be lowered.

Similarly, when the reception time of the target communication frame is earlier than the scheduled reception time, the predicted time range of reception of the subsequent target communication frame may be expanded by adding the difference (T−τ) amount to the end of the predicted time range. In such manner, even when reception delays are caused, for example, when a communication frame is received earlier than the scheduled reception time due to an ECU that keeps transmitting the frames with the same transmission period, time shifts due to delays that may affect the scheduled reception time in periodic transmissions may be corrected.

In other words, even when (i) there are transmission delays caused by the processing load of the sender device (e.g., ECU), or (ii) the communication load of the communication network 103 causes the retransmission of communication frames, the transmission period of the sender device might not change. However, even in such cases where the transmission period of the sending device does not change, by accounting for the transmission delays, the communication system 100 in the present disclosure can detect improper communication at a higher detection rate while minimizing the false detection rate. In other words, the communication system 100 can better distinguish between proper communications and improper communications.

In FIG. 8, the following variables are used:

T is a normal time interval between a first frame and a second frame, $\tau$ is an actual time interval between the first frame and the second frame, $\alpha$ is a difference between T and a minimum interval without collision, and $\beta$ is a difference between a maximum interval without collision and T.

The second frame for a periodic type of frame is expected to normally arrive during the first PREDICTED TIME RANGE, from $(T-\alpha)$ to $(T+\beta)$, as discussed above in FIG. 5.

Additionally, the second PREDICTED TIME RANGE (for receiving the third frame ID:200) is based on the actual timeTthat the second frame arrives. The third frame is expected to arrive at approximately the actual timeTplus the normal time T equals $(\tau+T)$. The range around the third frame begins at a minimum time equal to the expected arrival time of the third frame $(\tau+T)$, minus a difference between T and a minimum interval without collision ($\alpha$), and minus a difference between the actual time that the second frame arrived and the normal time $(\tau-T)$, Thus, the minimum time (or lower threshold) for the predicted time range of the third frame is: $(\tau+T)-\alpha-(\tau-T)$. Simplifying, this equals $\tau+T-\alpha-\tau+T$; which equals $2T-\alpha$. Thus, the lower threshold for the second predicted time range is $2T-\alpha$.

The maximum time (or upper threshold) for the predicted time range for the third frame is now derived. As discussed above, the third frame is expected to arrive at approximately the actual timeTplus the normal time T equals $(\tau+T)$. The range around the third frame ends at a maximum time equal to the expected arrival time of the third frame $(\tau+T)$ plus ($\beta$), equals $\tau+T+\beta$, Thus, the upper threshold for the second predicted time range is $\tau+T+\beta$. In summary, the second predicted time range begins at $(2T-\alpha)$ and ends at $(\tau+T+\beta)$, with respect to the first frame.

Alternatively, if the second predicted time range is calculated with respect to (starting from) the actual arrival of the second frame (at T), then the range of the second predicted time range is from $(T-\alpha-(\tau-T))$ to $(T+\beta)$, This range is simplified to a range from $(2T-\tau-\alpha)$ to $(T+\beta)$, measuring from the actual arrival of the second frame.

Figure 9:
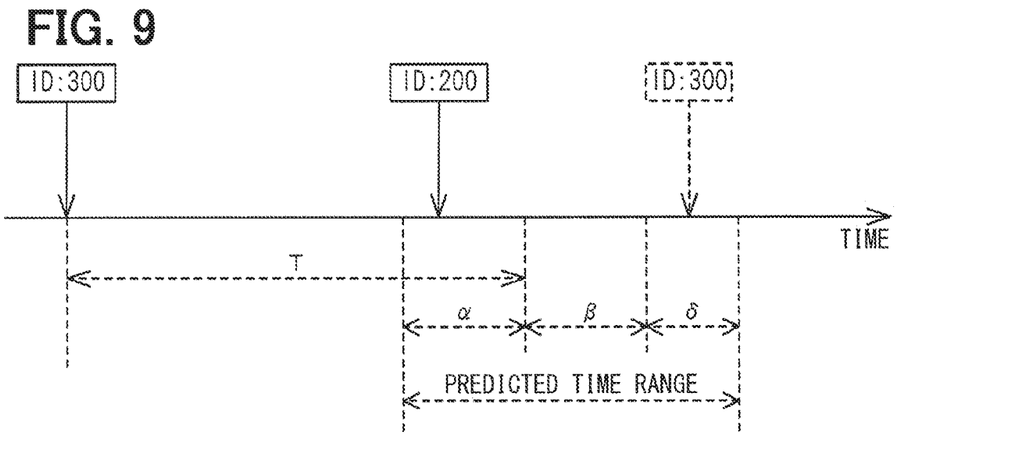
FIG. 9 illustrates a processing of a non-target frame received in the predicted time range.

FIG. 9 illustrates a situation where a communication frame with ID 200 is received within the predicted time range for the communication frame with ID 300. The reception predictor 202 can expand the predicted time range of the target communication frame by adding additional time $\delta$ to the end of the predicted time range, as shown in FIG. 9. For example, the reception predictor 202 may add additional time $\delta$ when a communication frame of a different type, that is, having a different ID from the target communication frame, is received within the predicted time range for receiving the target communication frame. Thereby, even when a delay of reception of a regular/normal communication frame is caused by an increased processing load of the processing device and the communication load of the network, by accounting for the transmission delays caused by such loads, the communication system 100 in the present disclosure can detect improper communication at a higher detection rate while minimizing the false detection rate.

In the above example, the second electronic control unit 102 that transmits the communication frame with ID 200 is different from the first electronic control unit 101 that transmits the communication frame with ID 300. In such a case, the transmitted communication frame with ID 300 collides with the communication frame with ID 200. Because the communication frame with ID 200 is considered as the communication frame having the higher priority, in this case, the communication frame with ID 200 is transmitted first due to priority. As such, the communication frame with ID 300 is retransmitted at a later time, e.g., after a preset time amount of time has elapsed. In frame collision cases, by having the reception predictor 202 expand the predicted time range by adding a difference amount $\delta$ to the end of the predicted time range for receiving communication frame with ID 300, the communication system 100 in the present disclosure can detect the improper communication at a higher detection rate while minimizing the false detection rate. That is, in this case, the communication system 100 accounts for the collision of the communication frame with the ID 300 and the retransmission delays caused by such collision, so that the retransmission of the communication frame with the ID 300 does not cause the communication frame (i.e., ID 300) to be identified as an abnormal frame.

In FIG. 9, $\delta$ is an additional time (a first difference amount, or a higher priority difference amount) added to extend the preliminary predicted time range during certain conditions. Initially, a first periodic frame (ID:300) generates an initial preliminary predicted time range (not shown in FIG. 9), from $(T-\alpha)$ to $(T+\beta)$, to receive a periodic frame.

However, FIG. 9 shows a second frame with a higher priority (ID:200) from a second controller colliding (being received during) the preliminary predicted time range (not shown in FIG. 9) of $(T-\alpha)$ to $(T+\beta)$. In this case, the predicted time range is modified or extended. Specifically, the maximum time (or upper threshold) is extended by an additional time $\delta$ (the first difference amount, or higher priority difference amount). Thus, FIG. 9 shows the (extended) PREDICTED TIME RANGE from $(T-\alpha)$ to $(T+\beta+\delta)$.

Figure 10:
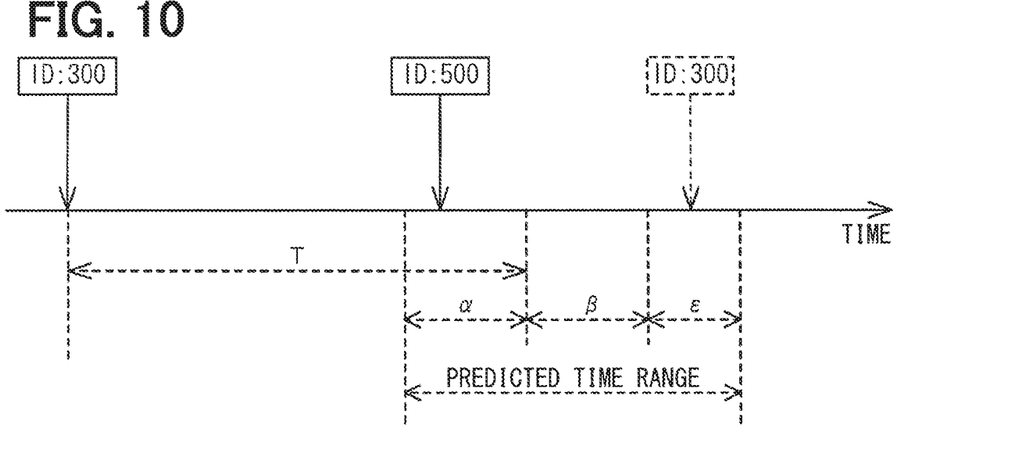
FIG. 10 illustrates another processing of a non-target frame received in the predicted time range.

FIG. 10 illustrates a situation where a communication frame with ID 500 is received within the predicted time range for receiving the periodically-transmitted communication frame with ID 300. Similar to the situation illustrated in FIG. 9, the reception predictor 202 can also expand the predicted time range of the target communication frame by adding an additional amount of time to the end of the predicted time range of the target communication frame when a communication frame of a different type is received within the predicted time range for receiving the target communication frame.

In this example, the first electronic control unit 101 that transmits the communication frame with ID 500 also transmits the communication frame with ID 300. In such case, a to-be-transmitted communication frame with ID 300 has to wait to be transmitted due to the transmission of the communication frame with ID 500. That is, the communication frame with ID 300 undergoes a transmission waiting where the transmission is pending, and will be transmitted later, after a preset time amount of time has elapsed. By having the reception predictor 202 expand the predicted time range by adding a difference amount c to the end of the predicted time range for receiving the target communication frame, the communication system 100 in the present disclosure can detect improper communication at a higher detection rate while minimizing the false detection rate. That is, in this case, the communication system 100 accounts for the delays caused by the processing load of a single ECU (e.g., transmitting communication frames of different types), so that the delay caused by the transmission pendency of the communication frame with ID 300 does not cause the communication frame with ID 300 to be identified as an abnormal frame.

In FIG. 10, $\varepsilon$ is an additional time (a first difference amount, or a lower priority difference amount) added to extend the preliminary predicted time range (not shown) during certain conditions that are different from the conditions in FIG. 9. In FIG. 10 a second frame (ID:500, non-periodic, with relatively low priority) arrives during the preliminary predicted time range (not shown).

The second frame (ID:500) (i) has a lower priority than the first frame (ID:300), (ii) is from the same controller as the first frame, and (iii) is non-periodic, in FIG. 10, the additional time $\varepsilon$ (lower priority difference amount) may be different than the additional time $\delta$ (higher priority difference amount) shown in FIG. 9.

Thus, in FIG. 10 the (extended) PREDICTED TIME RANGE is from $(T-\alpha)$ to $(T+\beta+\varepsilon)$.

As shown in FIGS. 9 and 10, expanding the predicted time range by adding additional time to the end of the predicted time range to offset any delays may be configured differently for different situations. For example, one situation may be the situation of FIG. 10 where a communication frame other than the target communication frame is received and transmitted by the same device/ECU that transmits the target communication frame. Another situation may be the situation in FIG. 9 where a communication frame that has a higher priority than the target communication frame is received, and is transmitted by a different device/ECU from the one that transmits the target communication frame. The processing load of a processing device has a likely effect on communication frames that are transmitted and received by the same processing device. The communication load on the communication network 103 has a likely effect on communication frames transmitted by one device and received by a different device. That is, in other words, communication frames may be affected in different ways by different causes, such that the delays caused by each of the different causes may be different in length and amount. As such, the amounts of time added to the end of the predicted time range may be different depending on the causes of the delay. For example, in the situation of FIG. 10 where a communication frame other than the target communication frame is received and transmitted by the same device/ECU, a first amount of time may be added to the end of the predicted time range. In the situation of FIG. 9 where a communication frame that has a higher priority than the target communication frame is received, and is transmitted by a different device/ECU that transmits the target communication frame, a second amount of time may be added to the end of the predicted time ranges. In these examples, the first amount of time may be different than the second amount of time, because in each of the above examples, the cause of the delay is different. Therefore, by setting respectively different amounts of delay for different situations, the communication system 100 in the present disclosure can detect the improper communication at a higher detection rate while minimizing the amount of false detections (e.g., detecting false positives as abnormal).

Figure 11:
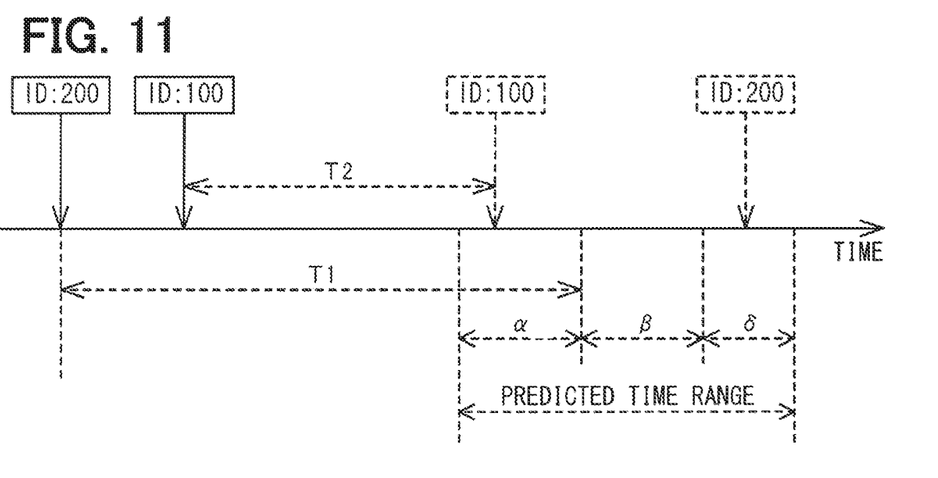
FIG. 11 illustrates another processing of a non-target frame received in the predicted time range.

FIG. 11 shows a situation, where a communication frame with ID 200 has a communication interval of T1 and a communication frame with ID 100 has a communication interval of T2. The communication frame with ID 100 is received during the predicted time range for receiving the communication frame with ID 200. In this situation, the predicted time range for receiving the communication frame with ID 200 is extended to also include the scheduled reception time or the predicted time range for receiving the communication frame with ID 100. It is very likely that in this situation there may be a collision between the communication frame with ID 100 and the communication frame with ID 200 on the communication network 103. In such case, the transmission of the higher priority communication frame with ID 100 is prioritized if a collision were to occur, and the retransmission of the communication frame with ID 200 would occur after a preset amount of time has elapsed. As such, the reception predictor 202 expands the predicted time range for receiving the communication frame with ID 200 by adding an additional difference amount $\delta$ to the end of the predicted time range. The difference amount $\delta$ is used in frame collision cases, for example, as described with reference to, and shown in FIG. 6. In such manner, the communication system 100 in the present disclosure can detect the improper communication at a higher detection rate and while minimizing the false detection rate. In this case, the communication system 100 does not recognize the retransmitted communication frame with ID 200 as abnormal, even though its transmission is shifted to account for a possible collision with the communication frame with ID 100.

Thus, the reception predictor 202 expands the predicted time range for receiving a first target communication frame of one type by adding an addition amount of time to the end of the predicted time range when the scheduled reception time or the predicted time range of a second target communication frame of another type is included within the predicted time range of the first target communication frame. Therefore, the improper communication is detectable at a higher detection rate while minimizing the false detection rate by the communication system 100, by correcting to the predicted time range for receiving the communication frame to one that is set in view of a predicted delay due to the processing load of the processing device or the network load.

Similar to the example of FIG. 10, in FIG. 11, when communication frames are transmitted by the same ECU, one frame is put in a transmission waiting or transmission pending state by the other frame. As such, the frame pending transmission or waiting to be transmitted is retransmitted later after a preset amount of time has elapsed. Consequently, the predicted time range may be expanded by adding the difference amount c to the end of the predicted time range. The difference amount $\varepsilon$, described with reference to, and shown in FIG. 7, is the difference of the communication interval in the transmission waiting generated case.

In FIG. 11, $\delta$ is an additional time (or a higher priority difference amount) and may have a different value than the $\delta$ used in FIG. 9.

In FIG. 11, a first periodic frame (ID:200, with a low priority) with a normal time interval of T1 has, as discussed with respect to FIG. 5, a (initial/preliminary) predicted time range of from (T−α) to (T+β) (not shown in FIG. 11).

However, in FIG. 11 a second periodic frame (ID:100, with a high priority) arrives before the preliminary predicted time range begins. The second periodic frame has a normal time interval of T2, such that a following/repeated high priority periodic frame is expected to arrive (based on T2) during the preliminary predicted time fame discussed above.

In this case, a new (extended) PREDICTED TIME RANGE is from (T−α) to (T+β+δ). Notice that in FIG. 11, this new (extended) PREDICTED TIME RANGE is generated even if no high priority frame is received during the preliminary predicted time range or during the (extended) PREDICTED TIME RANGE.

Figure 12:
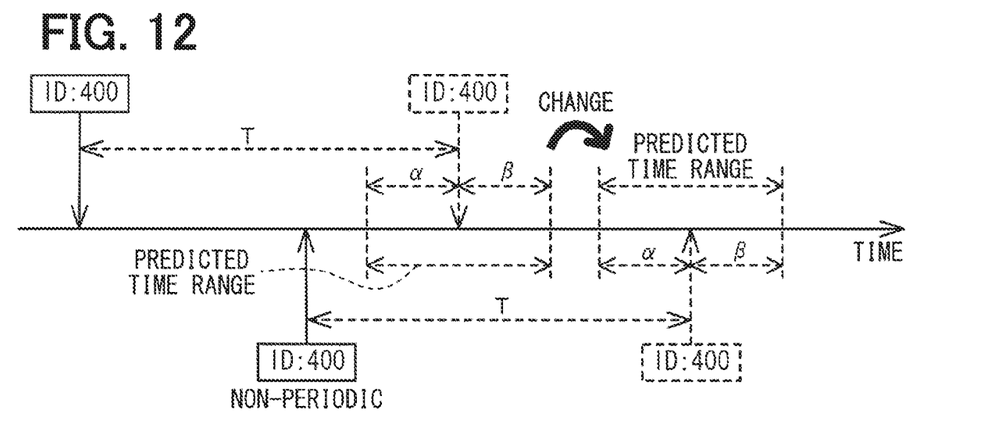
FIG. 12 illustrates a processing of a non-periodic transmission of the target communication frame during transmission.

FIG. 12 shows a situation where during a periodic transmission of communication frames with ID 400 at a communication interval T, a non-periodic transmission of a communication frame with ID 400 is received. When the communication frame with ID 400 is received outside the predicted reception time range, the abnormality determiner 203 refers to the frame information storage 210, and determines whether the communication frame received outside the predicted time range is a non-periodic transmission type communication frame. When the subject frame is determined to be a non-periodic transmission type frame, the received frame is determined to be a normal frame. In such manner, by confirming with the frame information storage 210 to determine whether an abnormal looking frame is a non-periodic transmission type communication frame for frame generated by a non-periodic event, the abnormality detection device 200 is enabled to confirm whether an abnormal looking frame is abnormal or a normal, non-periodic type frame. That is, the abnormality detection device 200 is enabled to make a proper determination of whether a frame is proper/normal without making the false determination that a normal frame that appears to be abnormal is abnormal. In other words, the abnormality detection device 200 minimizes identifying false positives (e.g., normal communication frames appearing to be abnormal) as abnormal. In such manner, the communication system 100 of the present embodiment is enabled to detect abnormalities and improper communication at a higher detection rate while minimizing false detections.

The event in the above example may be generated when a vehicle state notification is generated (e.g., check engine light, indication the vehicle transmission is in Park, low fuel), regardless of periodic or non-periodic type, when the communication network 103 is an in-vehicle network. A periodic event may be, for example, a depression amount of a brake pedal or an accelerator pedal, an operation angle of a steering wheel, an illuminance or light level indicative of an ambient luminosity of a vehicle. A non-periodic event may be, for example, the turning ON of the vehicle headlights. Further, in the course of determining a normal frame, the abnormality determiner 203 may determine a communication frame as a normal frame, by confirming a data change regarding a generation or occurrence of a non-periodic event, if the subject communication frame is the one that is transmitted due to the occurrence of a non-periodic event.

With reference to FIG. 3, the reception predictor 202 confirms with the frame information storage 210 whether a period is reset, for example, after a non-periodic transmission. As shown in FIG. 3, if a non-periodic transmission of the communication frame with ID 400 is performed, the period of the communication frame is reset after such non-periodic transmission. Then, as shown in FIG. 12, with reference to the scheduled reception time of the communication frame having been determined as a normal frame, i.e., a determined-as-normal communication frame, the predicted time range for receiving the target communication frame may be changed or updated. Further, the abnormality determiner 203 can determine if a communication frame that has once been determined as a normal frame is now an abnormal frame, when the target communication frame is not received within an updated predicted time range.

Thus, according to a predicted time range changing/update scheme described above, in which, according to a normal communication frame generated by an event (e.g., by a non-periodic event), a predicted time range of next reception of the same type communication frame is changed/updated by the reception predictor 202, the improper communication is detectable at a higher detection rate and a lower false detection rate. Further, if the target communication frame is not received within the updated predicted time range, the abnormality determiner 203 may determine that the determined-as-normal communication frame that caused the predicted time range to be changed/updated is abnormal. As such, the improper communication is detectable at a higher detection rate while minimizing the false detection rate.

In FIG. 12, a type of frame (ID:400) may be periodic or non-periodic. This frame type ID:400 is described in FIG. 3 as "non-periodic" with "(PERIOD RESET AFT TRANSMISSION)". It may be more descriptive to describe this frame as "semi-periodic with conditional reset".

In this case, a first frame (ID:400) is received, and a preliminary PREDICTED TIME RANGE is generated as shown in FIG. 12, with a range from (T−α) of to (T+β) as discussed above in FIG. 5. In this case, a second frame of the same type (ID:400) is received before the preliminary PREDICTED TIME RANGE begins. In this case, the predicted time range is "reset" based on the arrival time of the second frame, creating a (reset) PREDICTED TIME RANGE from (T−α) of to (T+β), but based on the arrival time (received time) of the second frame.

Figure 13:
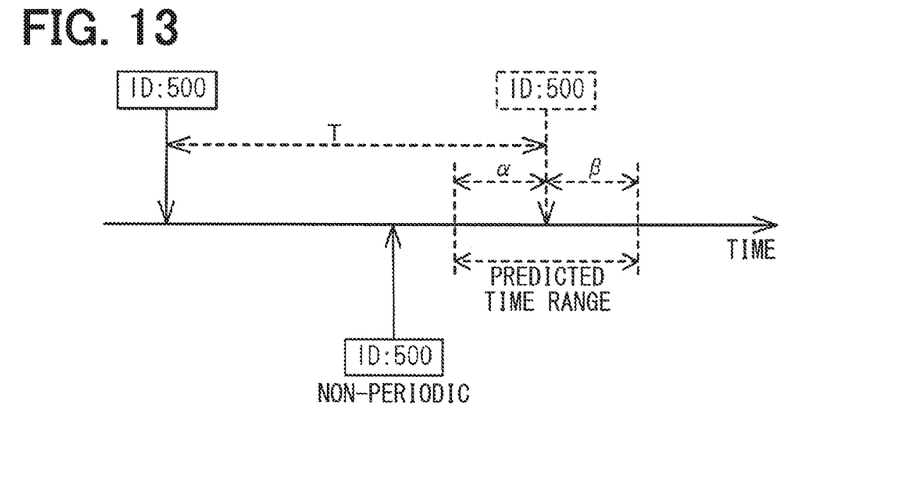
FIG. 13 illustrates another processing of a non-periodic transmission of the target communication frame during transmission.

FIG. 13 illustrates a situation where during a periodic transmission of communication frames with ID 500 at a communication interval T, the non-periodic transmission of communication frame with ID 500 is received. When the communication frame of identifier 500 is received outside of the predicted reception time range, the abnormality determiner 203 refers to the frame information storage 210, and can determine that the communication frame received at the outside of the predicted time range is a normal frame, when such a frame is a non-periodic transmission type communication frame. The reception predictor 202 may refrain from changing the predicted reception time range, by referring to the frame information storage 210 and by confirming that the non-periodic transmission of the communication frame with ID 500 may be performed independently from the periodic transmission of the communication frame with ID 500, as indicated in FIG. 3.

Figure 14:
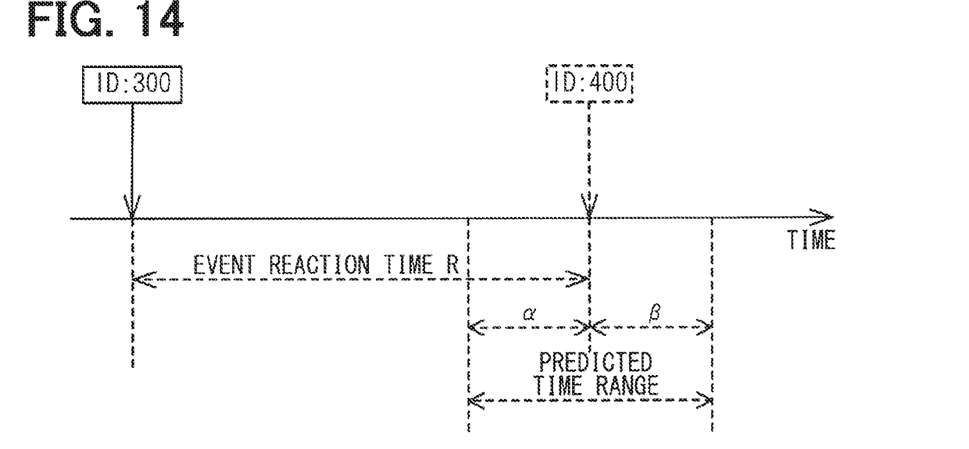
FIG. 14 illustrates how content of one communication frame during a periodic transmission causes a transmission of another type of communication frame.

FIG. 14 illustrates a situation where during a periodic transmission of communication frames with ID 300 at a communication interval T, a non-periodic transmission of the communication frame with ID 400 is performed due to a transmission of the communication frame of identifier 300. In such a case, the periodic transmission of the communication frame with ID 300 relates to data transmission and causes the non-periodic transmission of the communication frame with ID 400 when data to be transmitted by such communication frame satisfies a preset condition. For example, a communication frame with ID 300 may contain illuminance data indicative of ambient luminosity, which may cause non-periodic transmission of a communication frame with ID 400 to automatically turn ON vehicle headlights when illuminance falls below a certain value.

In such case, the reception predictor 202 can set the scheduled reception time and the predicted time range of reception with reference to an event reaction time R, which is a time around the reception of the non-periodic transmission type communication frame with ID 400, based on reception of the communication frame with ID 300 satisfying a preset condition. The event reaction time R may be calculated based on a past event reaction time R, or may be retrieved from the frame information storage 210.

As described above, the reception predictor 202 sets, with reference to the reception time of a first communication frame with ID 300, the predicted time range for receiving the target communication frame, that is, a second communication frame with ID 400 having a different frame type. Then, the abnormality determiner 203 can determine whether the first communication frame with ID 300 is an abnormal frame, when the target communication frame is not received within the predicted time range set in the above-described manner.

That is, the reception predictor 202 can set the predicted time range for receiving a communication frame of a different frame type. In such manner, the improper communication is detectable at a higher detection rate and a lower false detection rate. Further, because the communication frame causing the change of the predicted time range can be determinable as an abnormal frame, the improper communication is detectable at a higher detection rate and a lower false detection rate.

Figure 15:
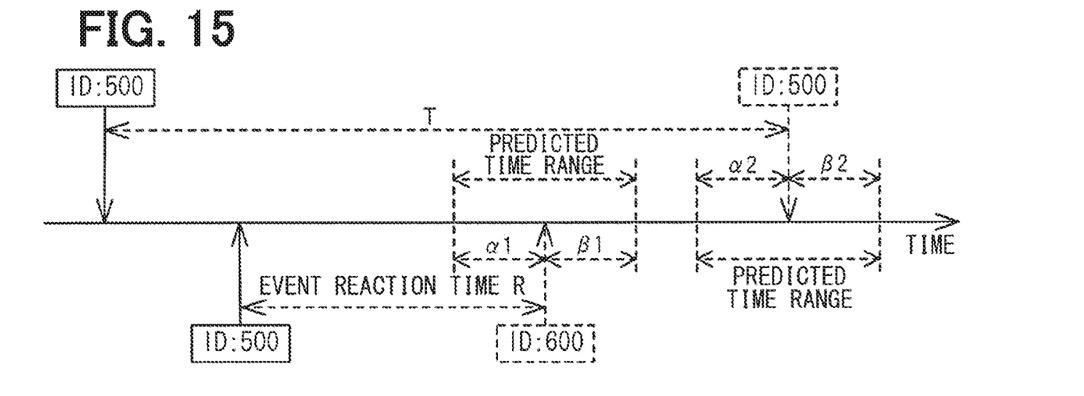
FIG. 15 illustrates how content of one communication frame during a non-periodic transmission causes a transmission of another type of communication frame.

FIG. 15 illustrates a situation where during a periodic transmission of communication frames with ID 500 at a communication interval T, a non-periodic transmission of the communication frame with ID 500 is performed. A periodic transmission of the communication frame with ID 500 in this case relates to data transmission. That is, the non-periodic transmission of the communication frame with ID 500 causes a non-periodic transmission of a communication frame with ID 600 when data to be transmitted by such communication frame satisfies a preset condition. For example, the communication frame with ID 500 may represent a sensor signal of a field monitoring device, and the communication frame with ID 600 may cause a buzzer operation in response to a change of such sensor signal.

Even in such case, the reception predictor 202 sets, by referencing the reception time of the first non-periodic transmission type communication frame with ID 500, the predicted time range for receiving the target communication frame, which is a second, different type of communication frame with ID 600.

Thus, the abnormality determiner 203 can determine whether the first non-periodic type communication frame with ID 500 is an abnormal frame, when the target communication frame is not received within the predicted time range set in the above-described manner. In such manner, the same effects as those achieved by the example in FIG. 14 may also be achieved by the example shown in FIG. 15.

Figure 16:
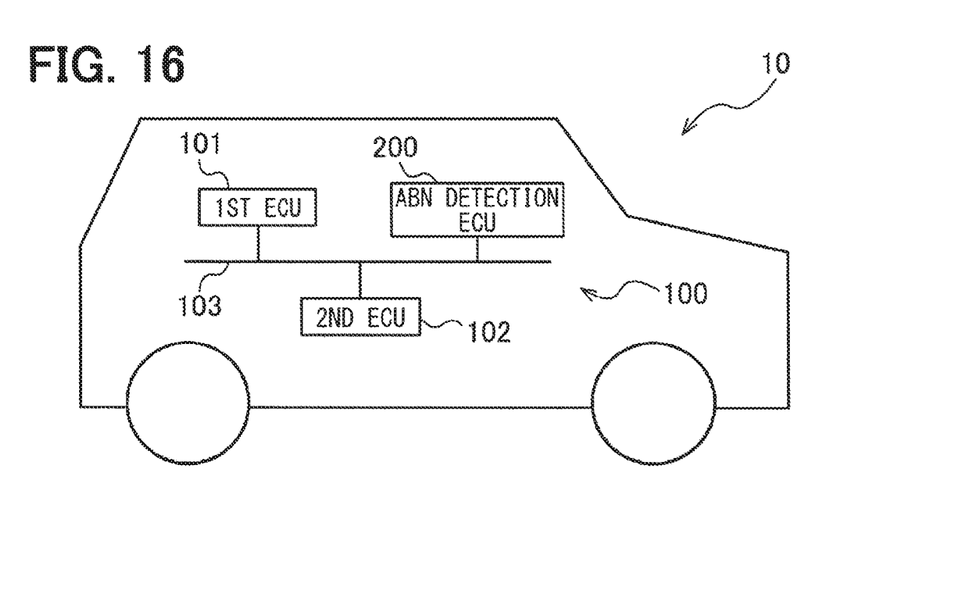
FIG. 16 illustrates an application of the communication system and the abnormality detection device in one embodiment of the present disclosure.

As shown in FIG. 16, the communication system 100 is applicable to the in-vehicle network disposed in an automobile 10 or the like. In such case, the communication system 100 may be connected to an external network including the Internet via wireless communications. With an application of the communication system 100, improper communication frames that may be generated, for example, by improper access from an external device and may be communicated via the communication network 103 are detectable at a higher detection rate and a lower false detection rate.

In the above paragraphs, the abnormality detection device together with the abnormality detection method, and communication systems for detecting abnormality are described as one embodiment of the present disclosure.

The abnormality detection device of the present disclosure may be implementable as an electronic control unit (ECU) of any type including a vehicle-mounted type. Further, the abnormality detection device of the present disclosure may, for example, take the form of a semiconductor, an electronic circuit, a module, a microcomputer, and the like. Such an exemplary device may be combined with an antenna, a communication interface, and any other hardware and or software for communication (e.g., to transmit/receive communication frames). Furthermore, the abnormality detection device of the present disclosure may also be provided as a vehicle navigation system, a smart phone, a personal computer, a portable information terminal, or the like.

In addition, the present disclosure may not only be realizable by using a dedicated hardware described above such as an ECU implementing an abnormality detection device, for example, but may also be realizable as a program stored in or saved on a non-transitory, substantive storage medium such as a memory, a hard disk drive, or the like together with a dedicated or general hardware capable of executing such a program. In such manner, by performing an update of such a program, a functionality of the abnormality detection device is always updatable to the latest version. That is, an abnormality detection program executable on a computer for implementing the above-described abnormality detection device/method is included in the scope of the present disclosure.

INDUSTRIAL APPLICABILITY

Although the present disclosure may be mainly applicable to the electronic control unit used in automobiles, it may also be used and applicable to other devices, such as two-wheel vehicles, electric-assist bicycles, vessels, airplanes, and the like. Further, applicability of the present disclosure is not limited to the transportation device described above.

Although the present disclosure has been fully described in connection with the embodiments thereof with reference to the accompanying drawings, it is to be noted that various changes and modifications will become apparent to those skilled in the art, and such changes, modifications, and summarized scheme are to be understood as being within the scope of the present disclosure as defined by appended claims.

What is claimed is:

1. An abnormality detector comprising:
   at least one processor;
   a receiver configured to communicate with controllers;
   a non-transitory computer-readable storage medium storing instructions that, when executed, perform the following abnormality detection process:
   receive a first frame from a transmitting controller;
   determine a first predicted time range for normally receiving a later frame, wherein the first predicted time range is from $(T-\alpha)$ to $(T+\beta)$, wherein:
   T is a normal time interval,
   $\alpha$ is a difference between T and a minimum interval without collision, and β is a difference between a maximum interval without collision and T, wherein the first frame is semi-periodic with conditional reset, is a first type, and is from a first controller, wherein a second frame of the first type is received before the first predicted time range, wherein the abnormality detector is further configured to determine a reset predicted time range after receiving the second frame, wherein the reset predicted time range is from (T−α) to (T+β), based on a received time of the second frame, and wherein a third frame of the first type is determined to be abnormal if the third frame arrives outside of the reset predicted time range.

* * * * *